United States Patent

[11] 3,588,346

[72] Inventor Robert J. Ramig, Jr.
Niles, Ill.
[21] Appl. No. 723,705
[22] Filed Apr. 24, 1968
[45] Patented June 28, 1971
[73] Assignee Teletype Corporation
Skokie, Ill.

[54] TAPE GUIDE
5 Claims, 3 Drawing Figs.

[52] U.S. Cl. .......... 178/42, 242/76
[51] Int. Cl. .......... H04l 13/06
[50] Field of Search .......... 178/42; 197/170; 242/76; 226/91; 271/59

[56] References Cited
UNITED STATES PATENTS
1,949,878 3/1934 Porter .......... 178/42

*Primary Examiner*—Kathleen H. Claffy
*Assistant Examiner*—Thomas W. Brown
*Attorneys*—T. L. Landis and R. P. Miller

ABSTRACT: A guide for paper tapes comprising a flat bottom wall, curved sidewalls that extend upwardly from the edges of the bottom wall and top walls that extend downwardly and inwardly from the upper edges of the sidewalls toward the center of the bottom wall to provide tape locating edges in the center of the guide and enlarged clearance passages at the edges of the guide to accommodate tapes having wrinkled edges.

INVENTOR
ROBERT J. RAMIG JR.

BY Michael A. O'Neil
ATTORNEY

TAPE GUIDE

BACKGROUND OF THE INVENTION

The telegraph industry has traditionally employed paper tape to record information. A problem occasionally encountered in the use of paper tape is the wrinkling of the edges of rolls of tape that have been exposed to excessive humidity. Excessive edge wrinkling prevents the passage of tapes through the tape guides heretofore employed in telegraph equipment thereby rendering tapes having wrinkled edges useless. Simply enlarging prior art tape guides to sufficient thickness to pass tapes having wrinkled edges is not satisfactory since tape guides having such thicknesses permit ordinary paper tapes to buckle when they are pushed through long tape guides.

SUMMARY OF THE INVENTION

In the preferred embodiment a tape guide suitable both for guiding tapes having wrinkled edges is comprised of a tape support surface, guide edges extending from the ends of the support surface far enough to clear wrinkled tape edges and locating surfaces extending from the guide edges toward the support surface for positioning the main body of tapes with respect to the support surface and for preventing tapes from buckling.

DESCRIPTION OF THE DRAWING

A more complete understanding of the invention may be had by referring to the following detailed description when taken in conjunction with the drawing wherein.

DETAILED DESCRIPTION

Figure 1:
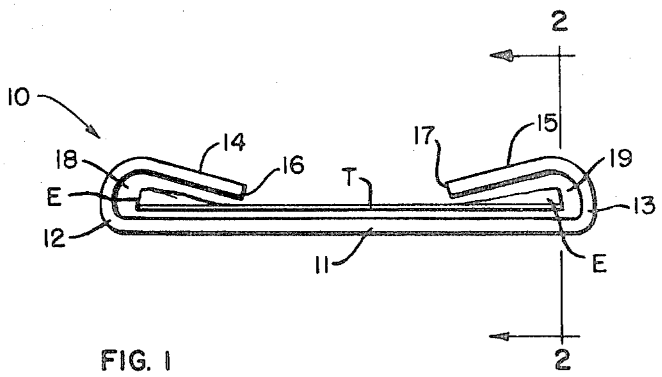
FIG. 1 is an end view of a tape guide employing the present invention.
Figure 2:
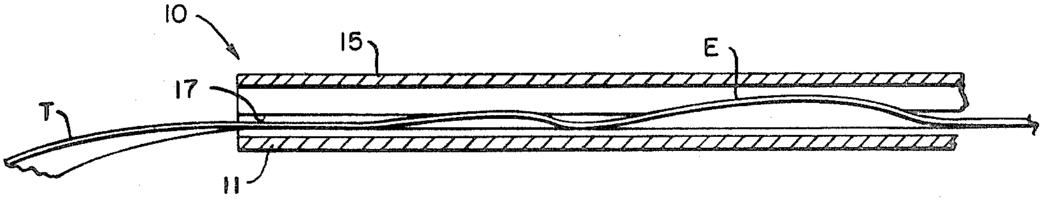
FIG. 2 is a longitudinal sectional view of the tape guide shown in FIG. 1 taken generally along the line 2–2 in FIG. 1 in the direction of the arrows.
Figure 3:
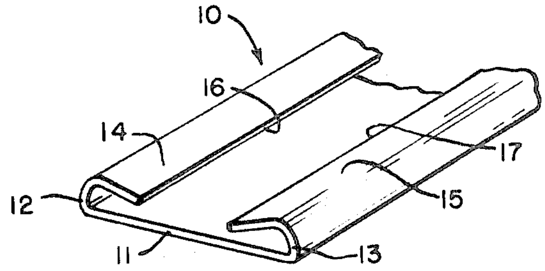
FIG. 3 is a perspective view of a tape guide shown in FIGS. 1 and 2.

Referring now to the drawing, wherein like reference numerals designate like parts throughout the several views, and referring particularly to FIG. 1 thereof, there is shown a tape guide 10 comprised of a bottom wall 11, a pair of curved sidewalls 12 and 13 and a pair of top walls 14 and 15 that extend downwardly and inwardly from the sidewalls 12 and 13 toward the bottom wall 11, respectively, and which terminate in locating surfaces 16 and 17, respectively. The tape guide 10 is preferably formed from a unitary body of a suitable material such as plastic, metal, etc., and extends in an unbroken curve from the locating surface 16 through the top wall 14, the curved sidewall 12, the bottom wall 11, the curved sidewall 13, and the top wall 15 to the locating surface 17.

In use, a tape T is threaded through the guide 10. The tape T is laterally positioned by the sidewalls 12 and 13 and is vertically positioned by the locating surfaces 16 and 17, it being understood that the terms top, bottom, lateral, and vertical are relative only and that the guide 10 may be positioned in any desired orientation. If the tape T has wrinkled edges E the height of the curved sidewalls 12 and 13 relative to the bottom wall 11 provides enlarged edge receiving portions 18 and 19 for the wrinkled edges E of the tape T while the surfaces 16 and 17 serve to both locate the main body of the tape T and to prevent the tape T from buckling when it is pushed through tape guides extending over long distances.

Although only one embodiment of the invention is shown in the drawings and described in the foregoing specification it will be understood that the invention is not limited to the specific embodiment shown but is capable of modification, rearrangement and substitution of parts and elements without departing from the scope of the invention.

I claim:

1. In a tape guide structure:
   - a bottom wall for providing support for a tape;
   - a sidewall extending from the bottom wall for restricting lateral movement of a tape toward the sidewall; and
   - a top wall extending form the sidewall toward the bottom wall and terminating in a surface positioned closer to the bottom wall than the point of attachment of the top wall to the sidewall for providing vertical guidance for a tape.
2. The structure according to claim 1 wherein the bottom wall is substantially flat and wherein the sidewall is curved, the concave surface of the sidewall facing toward the bottom wall.
3. The structure according to claim 2 wherein the bottom wall, the sidewall, and the top wall are formed from a unitary body of material.
4. A guide for a tape having wrinkled edges comprising:
   - a bottom wall;
   - a pair of sidewalls extending from the opposite edges of the bottom wall; and
   - a pair of top walls extending from the sidewalls toward each other and toward the bottom wall to form a pair of openings for receiving the wrinkled edges of tape, the top wall having extremities spaced from the bottom wall a distance sufficient to receive the tape and to prevent buckling of the tape.
5. A unitary guide for a tape having wrinkled, edges comprising:
   - a bottom wall section;
   - a pair of sidewall sections extending from a pair of opposite edges of the bottom section and curved toward each other for laterally positioning a tape on the bottom section; and
   - a pair of top wall sections extending from the tops of the sidewall sections toward each other and toward the bottom wall section to form a pair of openings for receiving the wrinkled edges of the tape, the top wall sections terminating in end surfaces spaced from the bottom wall section for receiving the tape and for preventing buckling of the tape.